Nov. 15, 1949     A. D. WALKER ET AL     2,488,456
AIR VALVE
Filed Nov. 17, 1947
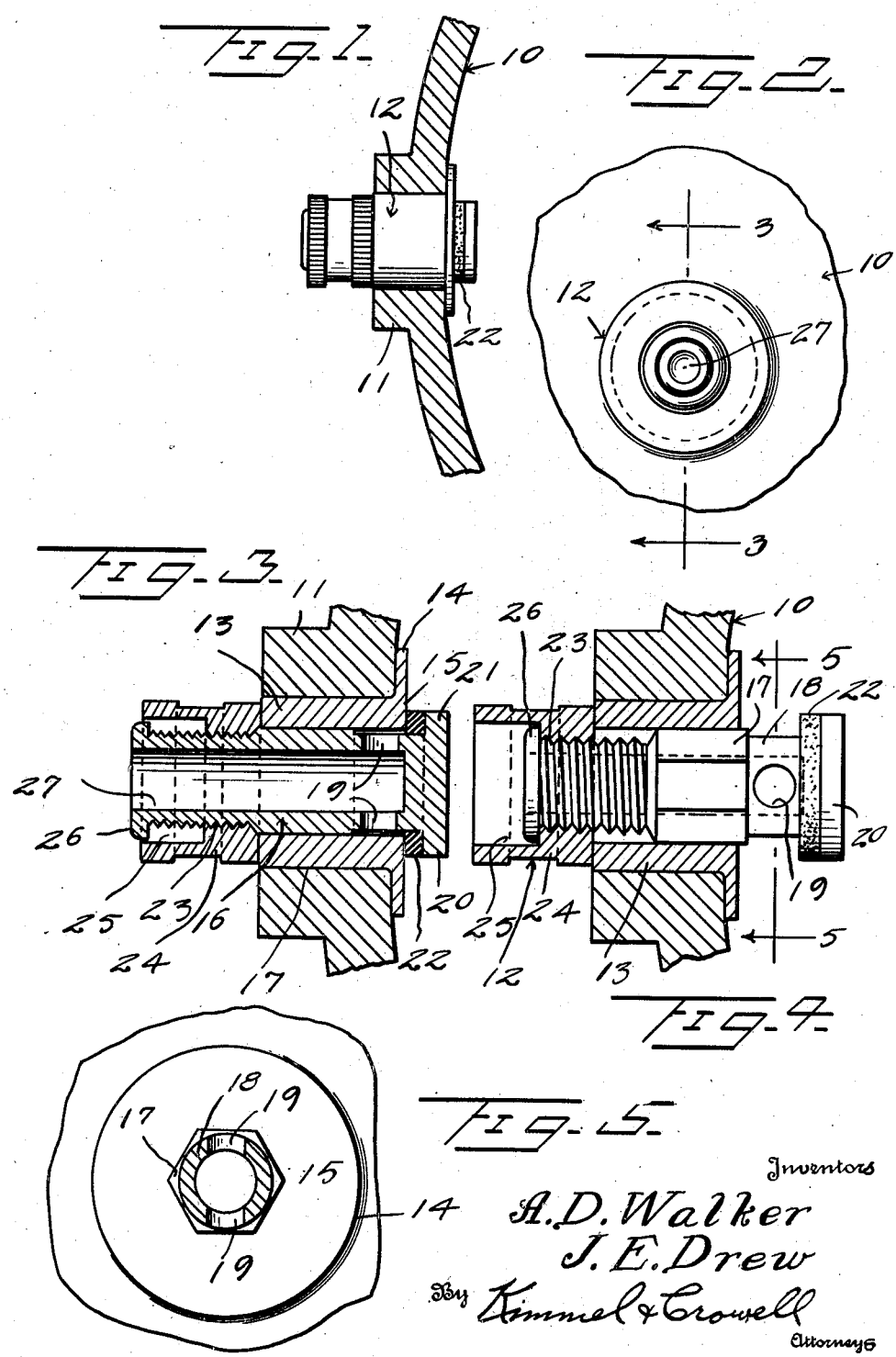
Inventors
A. D. Walker
J. E. Drew
By Kimmel & Crowell
Attorneys Patented Nov. 15, 1949

2,488,456

UNITED STATES PATENT OFFICE 2,488,456

AIR VALVE

Alexander Duncan Walker and John Earl Drew,
North Bergen, N. J.

Application November 17, 1947, Serial No. 786,442,

1 Claim. (Cl. 251—43)

This invention relates to air valves and is an improvement over the air valve embodied in our copending application, Serial No. 714,539, for Air valves, filed December 6, 1946.

An object of this invention is to provide an air valve adapted to be mounted on an inflatable body which eliminates the use of springs and provides a suitable means whereby the body may be inflated and after inflating the valve may be moved under pressure from the interior to closed or sealing position.

Another object of this invention is to provide an air valve of this kind which is of simple construction and includes a slidable valve plug embodying a sealing gasket at the inner end thereof for engagement against a valve seat formed on the inner end of the valve housing.

A further object of this invention is to provide an air valve which may be made at least partly out of plastic material and which is formed of a minimum of parts.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawing:

Figure 1 is a detailed side elevation of an air valve constructed according to an embodiment of this invention, showing the valve mounted on an inflatable body which is partly broken away and in section.

Figure 2 is an outer end elevation of the device.

Figure 3 is a sectional view taken on the line 3—3 of Figure 2.

Figure 4 is a sectional view similar to Figure 3 but at right angles thereto.

Figure 5 is a sectional view taken on the line 5—5 of Figure 4.

Referring to the drawing, the numeral 10 designates generally an inflatable body which may be formed out of rubber or the like. The body 10 has mounted in a reinforcing nipple 11 thereof a valve housing generally designated as 12. The valve housing 12 includes a sleeve 13 which extends through the nipple 11 and terminates at its outer end substantially flush with the outer end of the nipple 11. The inner end of the sleeve 13 is provided with an annular flange 14 abutting against the inside of the body 10 and the flange 14 is formed on the inner side thereof with a valve seat 15.

A valve plug 16 loosely engages in the sleeve 13 and comprises a hollow member which is formed with polygonal faces 17 adapted to slidably engage in a polygonal bore 18 formed in the sleeve 13. The hollow member or plug 16 includes a reduced nipple 18 formed with a pair of diametrically opposed openings 19 and the plug 16 also includes an inner end wall 20 formed with an annular flange 21. An annular gasket 22 is disposed about the end member 20 and engages against the outer side of the annular flange 21 so that when the plug 16 is moved outwardly the gasket 22 will engage against the valve seat 15.

The plug 16 also includes an outer threaded portion 23 which is engaged by a nut 24. The nut 24 is formed with a counterbore 25 within which the crimped outer end 26 of the plug 16 is adapted to loosely engage. In this manner after the plug 16 has been crimped at its outer end the nut 24 cannot be unthreaded from the threaded shank 23.

Rotation of the nut 24 in a clockwise direction will draw plug 16 outwardly to closed position. Rotation of nut 24 in a counter-clockwise direction and holding of the nut 24 against the outer end of the sleeve 13 will cause plug 16 to move inwardly so that the bore 27 of the plug 16 will communicate with the interior of the body 10 through the openings 19. After the body 10 has been inflated to the desired degree the plug 16 can be quickly moved outwardly to closed position by pulling the nut 24 outwardly and drawing therewith plug 16 to engage gasket 22 on seat 15. Nut 24 may then be threaded tight on plug 16 to prevent inward movement of the plug to open position.

We claim:

An air valve for an inflatable body comprising a tubular member adapted to be fixed in said body, a flange carried by the inner end of said member and formed with a valve seat, said member having a polygonal bore therethrough, a valve plug having a polygonal outer surface slidable in said bore, a compressible gasket carried by said plug engageable on said seat, external threads on said plug extending inwardly from the outer end thereof, said plug having a bore terminating outwardly of the inner end thereof and having a lateral opening adjacent the inner end thereof communicating with said bore, a nut threaded on said threads adapted upon rotation in one direction to pull said plug outwardly to closing position, and a rib carried by said member, said nut having a counter bore within which said rib is adapted to engage to prevent complete removal of said nut from said member.

ALEXANDER DUNCAN WALKER.
JOHN EARL DREW.

REFERENCES CITED

The following references are of record in the file of this patent:

UNITED STATES PATENTS

| Number | Name | Date |
|---|---|---|
| 503,300 | Welch | Aug. 15, 1893 |
| 505,486 | Schrader | Sept. 26, 1893 |
| 975,646 | Sidney | Nov. 15, 1910 |
| 1,237,041 | Hilding | Aug. 14, 1917 |
| 1,542,704 | Kirkpatrick | June 16, 1925 |
| 1,823,018 | Wolfard | Sept. 15, 1931 |
| 2,318,964 | Parker | May 11, 1943 |